United States Patent
Yamazaki et al.

(10) Patent No.: US 7,381,482 B2
(45) Date of Patent: *Jun. 3, 2008

(54) HEXAGONAL FERRITE MAGNETIC POWDER, METHOD FOR PRODUCING THE SAME AND MAGNETIC RECORDING MEDIUM

(75) Inventors: Nobuo Yamazaki, Kanagawa (JP); Masatoshi Takahashi, Kanagawa (JP); Akira Manabe, Shizuoka (JP); Hiroyuki Suzuki, Shizuoka (JP)

(73) Assignees: Asahi Techno Glass Corporation, Chiba (JP); FUJIFILM Corporation, Tokyo (JP)

( * ) Notice: Subject to any disclaimer, the term of this patent is extended or adjusted under 35 U.S.C. 154(b) by 233 days.

This patent is subject to a terminal disclaimer.

(21) Appl. No.: 11/155,591

(22) Filed: Jun. 20, 2005

(65) Prior Publication Data
US 2007/0020489 A1    Jan. 25, 2007

(30) Foreign Application Priority Data
Jun. 21, 2004    (JP)    .................... P.2004-182598

(51) Int. Cl.
G11B 5/716 (2006.01)
(52) U.S. Cl. .................... 428/842.8; 428/402
(58) Field of Classification Search ................ 428/836, 428/842.8; 252/62.63, 62.58
See application file for complete search history.

(56) References Cited

U.S. PATENT DOCUMENTS

| | | | |
|---|---|---|---|
| 7,132,164 B2 * | 11/2006 | Yamazaki et al. ......... 428/402 |
| 7,166,317 B2 * | 1/2007 | Naoe ........................ 427/127 |
| 2002/0068197 A1 * | 6/2002 | Ejiri et al. ........... 428/694 TM |
| 2003/0082409 A1 * | 5/2003 | Yamazaki et al. .... 428/694 BS |
| 2003/0138668 A1 * | 7/2003 | Noguchi et al. ...... 428/694 BS |
| 2003/0148128 A1 * | 8/2003 | Tomaru et al. ............ 428/480 |
| 2004/0091610 A1 * | 5/2004 | Naoe ........................ 427/127 |
| 2007/0020489 A1 * | 1/2007 | Yamazaki et al. ....... 428/842.8 |

FOREIGN PATENT DOCUMENTS

| JP | 58-42203 A | 3/1983 |
|---|---|---|
| JP | 3-12442 B2 | 2/1991 |
| JP | 10-92618 A | 4/1998 |
| JP | 10-312525 A | 11/1998 |

* cited by examiner

*Primary Examiner*—Holly Rickman
*Assistant Examiner*—Gary Harris
(74) *Attorney, Agent, or Firm*—Sughrue Mion, PLLC

(57) ABSTRACT

A hexagonal ferrite magnetic powder having an average tabular diameter of from 15 to 28 nm, a coercive force (Hc) of from 2,000 to 5,000 Oe (from 160 to 400 kA/m), a switching field distribution (SFD) of from 0.3 to 0.7 and a D70/D50 of from 1.05 to 1.25. This magnetic powder can be obtained by melting and quenching starting materials to obtain an amorphous product, and thermally treating the product, which comprises increasing a temperature at a rate of 300 to 500° C./hr in a temperature range of 550 to 600° C. in the thermal treatment before the temperature reaches the thermally treating temperature.

3 Claims, 1 Drawing Sheet

HEXAGONAL FERRITE MAGNETIC POWDER, METHOD FOR PRODUCING THE SAME AND MAGNETIC RECORDING MEDIUM

BACKGROUND OF THE INVENTION

1. Field of the Invention

The present invention relates to a hexagonal ferrite magnetic powder, a method for producing the same and a magnetic recording medium. More particularly, it relates to a hexagonal ferrite magnetic powder which provides good output characteristics and yields a reduced noise and which is adapted for a magnetic recording medium for high-density recording reproducible by a highly sensitive head such as an MR head or a GMR head. Also, the invention relates to a magnetic recording medium containing the hexagonal ferrite magnetic powder in the magnetic layer.

2. Description of the Related Art

In the field of magnetic recording, a magnetic head based on the principle of electromagnetic induction (induction type magnetic head) has been used and spread. However, the induction type magnetic head is becoming insufficient for use in the presently required reproduction of high-density records. That is, when the number of coil turns of a reproduction head is increased in order to obtain a larger reproduction output, there results an increased inductance and an increase in resistance in high frequency region, leading to a problem of reduction in reproduction output. Thus, in recent years, a reproduction head based on the principle of MR (magnetic reluctance) has been proposed and used for a hard disc or the like. The MR head yields a reproduction output several times as much as that of the induction type magnetic head and, since no induction coils are used, device noises such as impedance noise are markedly reduced. Therefore, a large SN ratio can be obtained.

On the other hand, the improvement of high-density recording characteristics can also be made by reducing magnetic recording medium noise having conventionally been hidden behind the device noises.

In order to attain such object, there has been proposed, for example, a magnetic recording medium comprising a non-magnetic support having provided thereon a magnetic layer containing a hexagonal ferrite magnetic powder dispersed in a binder (see, for example, JP-A-10-312525).

Also, the improvement of the hexagonal ferrite magnetic powder is disclosed in the following JP-A-10-92618 and Japanese Patent No. 1,652,829. The JP-A-10-92618 discloses a hexagonal ferrite magnetic powder having an average particle size of from 30 to 40 nm, a specific surface area measured by the BET method of from 30 to 70 m²/g, an SFD of 0.9 or less, and a probability of existence of particles having an average article size of 10 nm or less of 5% or less. Also, the Japanese Patent No. 1,652,829 discloses a method of producing a hexagonal ferrite according to the glass crystallization method, which comprises heating the temperature at a rate of 200° C./hr in the step of heating an amorphous product at a temperature of 775 to 800° C. to crystallize hexagonal ferrite to thereby depress the maximum particle size to 0.3 µm or less.

However, these related techniques have failed to provide a magnetic recording medium adapted for a high-density recording as high as about 1 Gbpsi, which is a presently required level.

SUMMARY OF THE INVENTION

An object of the invention is to provide a hexagonal ferrite magnetic powder adapted for a magnetic recording medium for high-density recording which provides good output characteristics and yields a reduced noise and which is adapted for a magnetic recording medium for high-density recording reproducible by a highly sensitive head such as an MR head or a GMR head, a method for producing the same and a magnetic recording medium.

The invention is as follows.

(1) A hexagonal ferrite magnetic powder having an average tabular diameter of from 15 to 28 nm, a coercive force (Hc) of from 2,000 to 5,000 Oe (from 160 to 400 kA/m), a switching field distribution (SFD) of from 0.3 to 0.7 and a D70/D50 of from 1.05 to 1.25.

(2) A method for producing a hexagonal ferrite magnetic powder as described in (1) above, the method comprising:

melting hexagonal ferrite-producing materials so as to form melted hexagonal ferrite-producing materials, and quenching the melted hexagonal ferrite-producing materials to obtain an amorphous product; and subjecting the amorphous product to a thermal treatment to precipitate a hexagonal ferrite, wherein the thermal treatment comprises a temperature-increasing process: in the thermal treatment for the amorphous product at a final temperature of 600 to 750° C., a temperature is raised at a rate of 300 to 500° C./hr in a range of from 550 to 600° C. before the temperature reaches the final temperature.

(3) A magnetic recording medium comprising:
a non-magnetic support; and
a magnetic layer containing a hexagonal ferrite magnetic powder dispersed in a binder,
wherein the hexagonal ferrite magnetic powder is a hexagonal ferrite magnetic powder as described in (1) above.

(4) The magnetic recording medium as described in (3) above, which further comprises a non-magnetic layer containing a non-magnetic powder dispersed in a binder between the non-magnetic support and the magnetic layer.

DETAILED DESCRIPTION OF THE INVENTION

Figure 1:
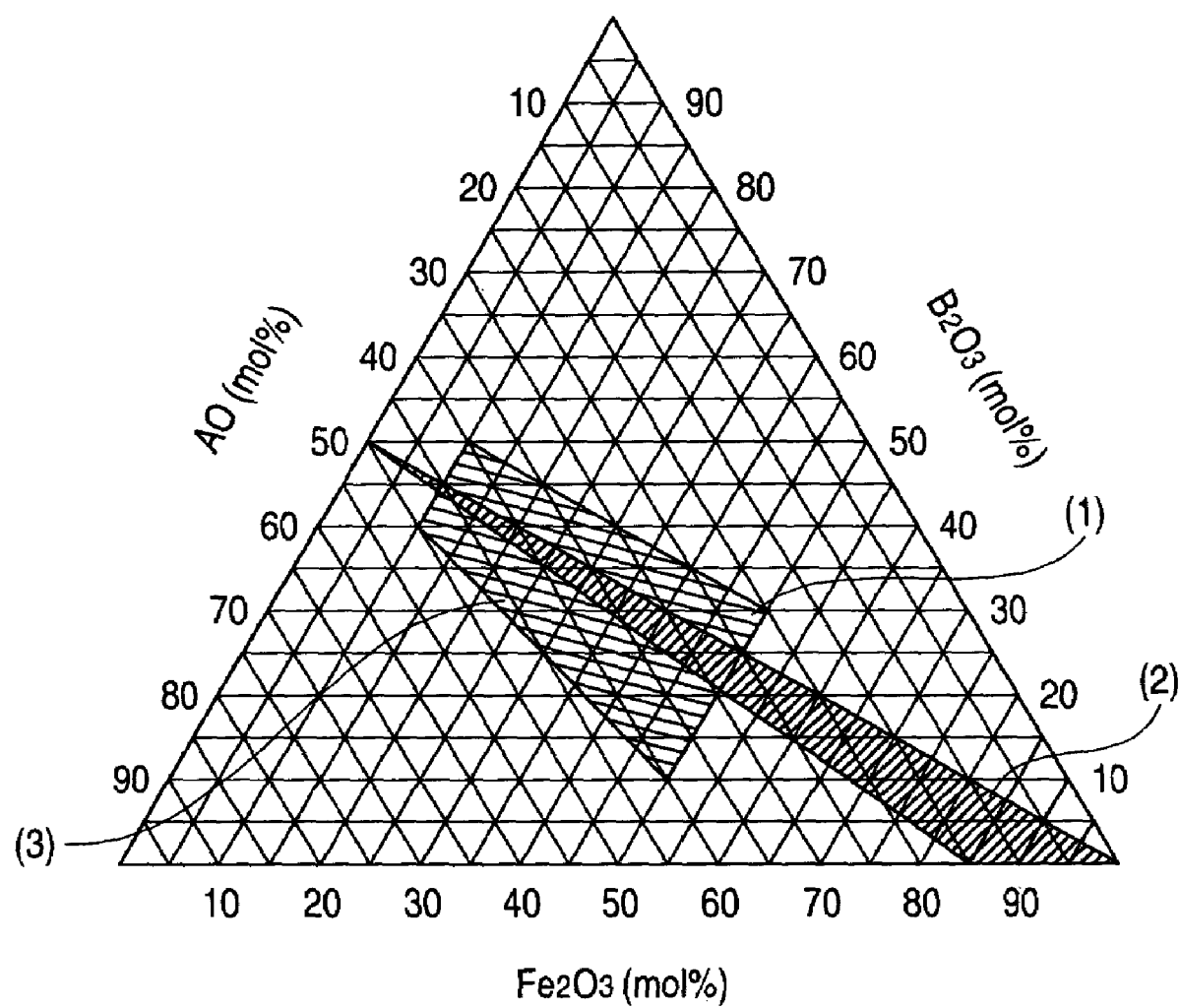
FIG. 1 shows a triangular diagram in accordance with the invention, wherein AO, $B_2O_3$ and $Fe_2O_3$ constitute apexes.

The invention is described in more detail below.

The hexagonal ferrite magnetic powder of the invention has an average tabular diameter of from 15 to 28 nm, preferably from 18 to 26 nm, a coercive force (Hc) of from 2,000 to 5,000 Oe (from 160 to 400 kA/m), preferably from 2,100 to 4,200 Oe (from 168 to 336 kA/m), a switching field distribution (SFD) of from 0.3 to 0,7, preferably from 0.3 to 0.6, and a D70/D50 of from 1.05 to 1.25, preferably from 1.05 to 1.20. In case when the average tabular diameter is less than 15 nm, there results insufficient magnetic characteristics whereas, in case when the average tabular diameter exceeds 28 nm, there results such a serious noise that a necessary SN ratio for a magnetic recording medium for high-density recording can not be ensured. In case when Hc is less than 2,000 Oe, there results an insufficient linear recording density whereas, in case when Hc exceeds 5,000 Oe, recording is not saturated, thus high density characteristics not being obtained. In order to reduce SFD to a level of less than 0.3, it is necessary to render the average tabular diameter of the magnetic powder to be 40 nm or more, thus such SFD not being suited for high density recording. On the other hand, in case when SFD exceeds 0.7, self demagnetization increases so much in short wavelength recording that there results a reduced output. Also, when D70/D50 exceeds 1.25, there results an increased SFD, thus such magnetic powder not being suited for high density recording. Additionally, it is difficult to produce a magnetic powder with a D70/D50 of less than 1.05.

In the invention, D50 means an average tabular diameter of 50% particle population in the particle size distribution represented as a cumulative curve, and D70 means an average tabular diameter of 70% particle population. D70/D50 represents a proportion of existence of coarse particles in the particle size distribution.

Generally, the tabular diameters of a hexagonal ferrite magnetic powder produced according to the glass crystallization method show approximately a logarithmic normal distribution.

In the invention, the logarithmic normal distribution is characterized in that, with particle population % on the vertical axis and particle size linearly on the horizontal axis, the distribution is a horizontally non-symmetric distribution wherein the larger particle side gradually decreases with the geometric average diameter (Dg) being the center.

It has conventionally been known that SFD can be improved by improving the particle size distribution of a magnetic powder. However, it has been found for the first time by the inventor that SFD can be improved by improving D70/D50.

As a result of applying statistical approach to SFD, specific surface area by BET method (Sbet) and Hc of the hexagonal ferrite magnetic powder, the inventor has found that SFD is in a mutual relation with the specific surface area and Hc and, with a magnetic material of 45 to 75 $m^2/g$ in specific surface area, it can be approximated by the following formula:

multiple correlation $SFD=0.03 \times Sbet(\text{found}) \times EXP(-0.051 \times Hc(\text{found}))+0.42$ That is, the effect of improving SFD can be evaluated by comparing SFD of a magnetic powder obtained by various tests with an approximate SFD calculated according to the above formula.

According to the invention, found SFD can be decreased by 0.05 to 0.2 in comparison with the approximate SFD by adjusting D70/D50 to a level of 1.25 or less.

In case when D70/D50 exceeds 1.25, the distribution on the side of larger particles than the geometric average diameter (Dg) becomes bad, i.e., the particle size distribution nears the related distribution, and the found SFD becomes worse than the approximate SFD. Thus, as has been described hereinbefore, such magnetic powder is not suited for high density recording.

Next, the method of the invention for producing a hexagonal ferrite magnetic powder is described.

The method of the invention for producing the hexagonal ferrite magnetic powder includes a step of melting hexagonal ferrite-producing materials and quenching the molten product to obtain an amorphous product and a subsequent step of subjecting the amorphous product to a thermal treatment to precipitate hexagonal ferrite, wherein the thermal treatment has the following temperature-increasing process:

Temperature-increasing process: in the thermal treatment of the amorphous product at a final temperature of 600 to 750° C., the temperature is raised at a rate of 300 to 500° C./hr, preferably 350 to 400° C./hr, in the range of from 550 to 600° C. before the temperature reaches the final thermally treating temperature.

That is, while the temperature for thermally treating an amorphous product to crystallize into hexagonal ferrite is usually 600 to 750° C., it is of importance for the amorphous product to be rapidly heated in the range of from 550 to 600° C. before reaching the thermally treating temperature starting from an ordinary temperature. According to the investigation of the inventor, with a barium ferrite magnetic powder, for example, crystals of several nm mainly comprising BaO and $Fe_2O_3$ precipitate at about 550° C., which in turn transform to hexagonal ferrite crystals by 600° C. (It has conventionally been believed that crystallization of BaO—$B_2O_3$ takes place at about 550° C.) That is, as a result of investigation by the inventors, it has been found that precipitation of nuclei and growth of precipitated nuclei partly proceed simultaneously, and that this is the cause of the increase of SFD. When the temperature-increasing rate in the range of from 550 to 600° C. is less than 300° C./hr, the precipitation of nuclei and the growth of the nuclei proceed simultaneously, and hence a desired D70/D50 can not be obtained, and there results an increased SFD. Thus, a magnetic powder suited for high density recording can not be obtained. Conversely, when the temperature-increasing rate exceeds 500° C./hr, self exothermic heat generated upon crystallization is accumulated, often causing uneven temperature distribution and, as a result, a desired D70/D50 can not be obtained.

Materials for producing hexagonal ferrite are not particularly limited. For example, in order to attain a high Hc and a high saturation magnetization of σs, it is preferred to contain at least one material which has a composition within the composition region of hatched areas (1) to (3) in the triangular diagram shown in FIG. 1 wherein AO (wherein A represents at least one member selected from among, for example, Ba, Sr, Ca and Pb), $B_2O_3$ and $Fe_2O_3$ are apexes). In particular, those materials are preferred which have a composition within the region surrounded by the following four points of a, b, c and d (hatched area (1)):

(a) $B_2O_3$=50, AO=40, $Fe_2O_3$=10 mol %
(b) $B_2O_3$=45, AO=45, $Fe_2O_3$=10 mol %
(c) $B_2O_3$=25, AO=25, $Fe_2O_3$=50 mol %
(d) $B_2O_3$=30, AO=20, $Fe_2O_3$=50 mol %

Also, the hexagonal ferrite in the invention may partly be substituted by a metal element. Examples of such substituting element include Co—Zn—Nb, Co—Ti, Co—Ti—Sn, Co—Sn—Nb, Co—Zn—Sn—Nb, Co—Zn—Zr—Nb and Co—Zn—Mn—Nb. Additionally, selection, compounding ratio and introducing amount of the metal element may properly be determined depending upon a necessary Hc, and the like.

The step of melting the starting materials is conducted at a temperature of, for example, 1,250 to 1,450° C., preferably 1,300 to 1,400° C. The quenching step may be conducted in a known manner, for example, by pouring a molten material onto a water-cooled twin roller rotating at a high speed to thereby mill and quench. The subsequent step of thermally treating the thus-obtained amorphous product is conducted under the aforementioned conditions. As to other conditions, the crystallizing time at 600 to 750° C. is from 2 to 12 hours, preferably from 3 to 6 hours. Subsequently, the product is acid-treated under heating to remove excess glass components, followed by washing with water and drying to obtain the hexagonal ferrite magnetic powder of the invention.

The specific surface area of the hexagonal ferrite magnetic powder of the invention is desirably in the range of from 45 to 80 m$^2$/g obtained by the BET method. In consideration of a packing property and an orientation property in the medium, the tabular ratio (arithmetic average) of the magnetic powder is desirably in the range of from 2.0 to 4.9, more preferably from 2.5 to 4.2. As the tabular ratio increases, the orientation property is more improved, and the switching field distribution (SFD) becomes sharper, but the packing property is deteriorated. In order to increase reproduction output, it is important to strike a balance among the improvement of packing property, improvement of the orientation property and sharpening of SFD and, as a result of such consideration, the above-mentioned regions having been found to be preferred.

The hexagonal ferrite magnetic powder of the invention may be subjected, as needed, to surface treatment with Al, Si, P, or oxide or hydroxide thereof. The amount thereof is preferably from 0.1 to 10% by weight based on the magnetic powder.

The invention also provides a magnetic recording medium comprising a non-magnetic support having provided thereon a magnetic layer containing the hexagonal ferrite magnetic powder of the invention dispersed in a binder. The magnetic recording medium of the invention is described hereinafter.

Non-Magnetic Support

As a support to be used in the invention, a flexible support is preferred, and known films of, for example, polyesters such as polyethylene terephthalate (PET) and polyethylene naphthalate (PEN); polyolefins; cellulose triacetate; polycarbonates; polyamides; polyamides; polyimides; polyamideimides; polysulfone; and aromatic polyamides such as aramide may be used. These supports may previously be subjected to corona discharge treatment, plasma treatment, adhesion-enhancing treatment, thermal treatment or dust-removing treatment. For effectively achieving the objects of the invention, it is preferred to use a support having a center-line average surface roughness of 0.03 μm or less, preferably 0.02 μm or less, more preferably 0.01 μm or less. Besides being small in center-line average surface roughness, the support is preferably free of coarse projections measuring 1 μm or above in height. Further, the surface roughness dimensions can be adjusted freely by selecting sizes and amounts of fillers added to the support as needed. Examples of such fillers include oxides and carbonates of Ca, Si and Ti and organic fine powders of, for example, acrylic resins.

Magnetic Layer

The binder to be used in the magnetic layer of the invention is a conventionally known thermoplastic resin, thermosetting resin, reactive resin or a mixture thereof. Examples of the thermoplastic resin include polymers and copolymers comprising structural units such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether; polyurethane resins; and various rubber resins.

Also, examples of the thermosetting resins and the reactive resins include phenol resins, epoxy resins, polyurethane curable resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyols and polyisocyanates, and mixtures of polyurethane and polyisocyanates. The thermoplastic resins, the thermosetting resins and the reactive resins are described in detail in Plastic Handbook published by Asakura Shoten.

Further, when an electron beam-curable resin is used in the magnetic layer, not only coating strength can be improved to improve durability, but also the surface is rendered smooth to enhance electromagnetic transducing characteristics. Examples thereof and methods for their production are described in detail in JP-A-62-256219.

These resins may be used independently or in combination thereof. Of these, use of polyurethane resin is preferred. Further, use of the following polyurethane resins is further preferred; a polyurethane resin prepared by reacting a cyclic compound such as hydrogenated bisphenol A or a polypropylene oxide adduct of hydrogenated bisphenol A, a polyol with a molecular weight of 500 to 5,000 having an alkylene oxide chain, a chain-extending agent of a polyol with a molecular weight of 200 to 500 having a cyclic structure, and an organic diisocyanate, as well as introducing a polar group; a polyurethane resin prepared by reacting an aliphatic dibasic acid such as succinic acid, adipic acid or sebacic acid, a polyester polyol comprising an aliphatic diol not having a cyclic structure having an alkyl branched side chain such as 2,2-dimethyl-1,3-propanediol, 2-ethyl-2-butyl-1,3-propanediol or 2,2-diethyl-1,3-propanediol, a chain-extending agent such as an aliphatic diol having a branched alkyl side chain containing three or more carbon atoms, such as 2-ethyl-2-butyl-1,3-propanediol or 2,2-diethyl-1,3-propanediol, and an organic diisocyanate, as well as introducing a polar group; and a polyurethane resin prepared by reacting a cyclic structure such as a dimmer diol, a polyol compound having a long alkyl chain, and an organic diisocyanate, as well as introducing a polar group.

The average molecular weight of the polyurethane resin containing the polar group which is employed in the invention is preferably from 5,000 to 100,000, more preferably from 10,000 to 50,000. The average molecular weight is preferably 5,000 or more in that it yields a magnetic coating that does not undergo a decrease in physical strength such as becoming brittle, and that does not affect the durability of the magnetic recording medium. Also, the molecular weight of 100,000 or less than that does not reduce solubility in solvent and thus affords a good dispersibility. Further, since the coating composition viscosity does not become high at a given concentration, the coating composition provides good manufacturing properties and facilitates its handling.

Examples of the polar group contained in the above-described polyurethane resins include —COOM, —SO$_3$M, —OSO$_3$M, —P=O(OM)$_2$, —O—P=O(OM)$_2$ (wherein M represents a hydrogen atom or an alkali metal base), —OH, —NR$_2$, —N$^+$R$_3$ (wherein R represents a hydrocarbon group), an epoxy group, —SH and —CN. At least one of these polar groups may be incorporated by copolymerization or an addition reaction for use. When the polar group-containing polyurethane resin has an OH group, a branched OH group is preferred from the viewpoint of curing properties and durability. The number of the branched OH group is preferably from 2 to 40, more preferably from 3 to 20, per molecule. The quantity of such polar groups ranges from $10^{-1}$ to $10^{-8}$ mol/g, preferably from $10^{-2}$ to $10^{-6}$ mol/g.

Specific examples of these binders include VAGH, VYHH, VMCH, VAGF, VAGD, VROH, VYES, VYNC, VMCC, XYHL, XYSG, PKHH, PKHJ, PKHC and PKFE [manufactured by Union Carbide Corporation]; MPR-TA, MPR-TA5, MPR-TAL, MPR-TSN, MPR-TMF, MPR-TS, MPR-TM and MPR-TAO [manufactured by Nissin Kagaku Kogyo K.K.]; 1000W, DX80, DX81, DX82, DX83 and 100FD [manufactured by Denki Kagaku Kogyo K.K.];

MR-104, MR-105, MR110, MR100, MR555 and 400X-110A [manufactured by Nippon Zeon Co., Ltd.], Nippollan N2301, N2302 and N2304 [manufactured by Nippon Polyurethane Co., Ltd.]; Pandex T-5105, T-R3080, T-5201, Burnock D-400, D-210-80, Crisvon 6109 and 7209 [manufactured by Dainippon Ink & Chemicals Incorporated]; Vylon UR8200, UR8300, UR-8700, RV530 and RV280 [manufactured by Toyobo Co., Ltd.]; Daipheramine 4020, 5020, 5100, 5300, 9020, 9022 and 7020 [manufactured by Dainichiseika Color & Chemicals Mfg. Co., Ltd.]; MX5004 [manufactured by Mitsubishi Chemical Corporation]; Sanprene SP-150 [manufactured by Sanyo Chemical Industries, Ltd.]; and Saran F310 and F210 [manufactured by Asahi Chemical Industry Col, Ltd.].

The addition amount of the binder to be used in the magnetic layer of the invention ranges from 5 to 50 parts by weight, preferably from 10 to 30 parts by weight, based on the weight of the magnetic powder. In the case of using the polyurethane resin, it is preferably employed in a quantity of from 2 to 20% by weight and, in the case of using the polyisocyanate, it is preferably employed in a quantity of from 2 to 20% by weight. It is preferable to employ them together. However, for example, when head corrosion occurs due to the release of a trace amount of chlorine, it is possible to employ only polyurethane or polyurethane and isocyanate. In the case of using a vinyl chloride-based resin as other resin, the preferred range is 5 to 30% by weight. When using polyurethane in the invention, the glass transition temperature ranges from −50 to 150° C., preferably from 0 to 100° C., the elongation at break preferably ranges from 100 to 2,000%, the stress at break preferably ranges from 0.49 to 98 MPa (from 0.05 to 10 kg/mm$^2$), and the yield point preferably ranges from 0.49 to 98 MPa (from 0.05 to 10 kg/mm$^2$).

The magnetic recording medium to be used in the invention in the form of, for example, a floppy disk can be constituted by two or more layers provided on each side of a support. Accordingly, the quantity of binder, the proportion of vinyl chloride resin, polyurethane resin, polyisocyanate or some other resin in the binder, the molecular weight and quantity of polar groups in the various resins forming the magnetic layer, and the physical characteristics of the aforesaid resins may be varied as needed in the non-magnetic layer and the individual magnetic layers or, rather, should be optimized with each layer. Known techniques for a multi-layered magnetic layer may be applied. For example, when varying the quantity of binder in each layer, the quantity of binder in the magnetic layer may be increased to effectively reduce rubbing damage on the surface of the magnetic layer, and the quantity of binder in the non-magnetic layer may be increased to impart flexibility for good head touch.

Examples of the polyisocyanate to be used in the invention include isocyanates such as tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate and triphenylmethanetriisocyanate; adducts between these isocyanates and polyalcohols; and polyisocyanates produced by condensation of isocyanates. Commercially available products of these isocyanates include Colonate L, Colonate HL, Colonate 2030, Colonate 2031, Millionate MR and Millionate MTL [manufactured by Nippon Polyurethane Industry Co., Ltd.]; Takenate D-102, Takenate D-110N, Takenate D-200 and Takenate D-202 [manufactured by Takeda Chemical Industries, Ltd.]; and Desmodur L, Desmodur I L, Desmodur N and Desmodur HL [manufactured by Sumitomo Bayer Urethane Co., Ltd.]. These may be used independently or as a combination of two or more thereof utilizing difference in curing activity in the respective layers.

As needed, additives can be added to the magnetic layer in the invention. Examples of the additives include abrasives, lubricants, dispersants, dispersing aids, fungicides, antistatic agents, antioxidants, solvents and carbon black. As the additives, there may be used, for example, molybdenum disulfide; tungsten disulfide; graphite; boron nitride; graphite fluoride; silicone oils; silicones having a polar group; fatty acid-modified silicones; fluorine-containing silicones; fluorine-containing alcohols; fluorine-containing esters; polyolefins; polyglycols; polyphenyl ethers; aromatic ring-containing organic phosphonic acids such as phenylphosphonic acid, benzylphosphonic acid, phenethylphosphonic acid, α-methylbenzylphosphonic acid, 1-methyl-1-phenethylphosphonic acid, diphenyulmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenyllphosphonic acid, butylphenylphosphonic acid, heptylphenylphosphonic acid, octylphenylphosphonic acid and nonylphenylphosphonic acid, and the alkali metal salts thereof; alkylphosphonic acids such as octylphosphonic acid, 2-ethylhexylphosphonic acid, iso-octyl phosphonic acid, iso-nonylphosphonic acid, iso-decylphosphonic acid, isoundecylphosphonic acid, iso-dodecylphosphonic acid, iso-hexadecylphosphonic acid, iso-octadecylphosphonic acid and iso-eicosylphosphonic acid, and the alkali metal salts thereof; phosphoric acid aromatic esters such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, heptylphenyhl phosphate, octylphenyl phosphate and nonylphenyl phosphate, and the alkali metal salts thereof; alkyl phosphates such as octyl phosphate, 2-ethylhexyl phosphate, iso-octyl phosphate, iso-decyl phosphate, iso-undecyl phosphate, iso-dodecyl phosphate, iso-hexadecyl phosphate, iso-octadecyl phosphate and iso-eicosyl phosphate, and the alkali metal salts thereof; alkylsulfonic acid esters and the alkali metal salts thereof; fluorine-containing alkylsulfuric acid esters and the alkali metal salts thereof; monobasic fatty acids with 10 to 24 carbon atoms (which may contain an unsaturated bond or may be branched) such as lauric acid, myristic acid, palmitic acid, stearic acid, behenic acid, butyl stearate, oleic acid, linoleic acid, linolenic acid, elaidic acid and erucic acid, and the alkali metal salts thereof; monofatty acid esters, difatty acid esters or polyfatty acid esters comprising a monobasic fatty acid with 2 to 22 carbon atoms (which may have an unsaturated bond or may be branched) and at least one of alcohols having 1 to 6 hydroxyl groups with 12 to 22 carbon atoms (which may have an unsaturated bond or may be branched), alkoxyalcohols with 12 to 22 carbon atoms (which may have an unsaturated bond or may be branched) and monoalkyl ethers of alkylene oxide polymers, such as butyl stearate, octyl stearate, amyl stearate, iso-octyl stearate, octyl myristate, butyl laurate, butoxyethyl stearate, anhydrosorbitan monostearate and anhydrosorbitan tristearate; aliphatic acid amides containing 2 to 22 carbon atoms; and aliphatic amines containing 8 to 22 carbon atoms. Compounds having an alkyl group, an aryl group or an aralkyl group substituted by a group other than the above-mentioned hydrocarbon groups, such as a nitro group, F, Cl, Br, $CF_3$, $CCl_3$ or $CBr_3$ etc. a halogen-containing hydrocarbon group, may also be employed.

Further, nonionic surfactants such as alkylene oxide-based surfactants, glycerin-based surfactants, glycidolbased surfactants and alkylphenol-ethylene oxide adducts; cationic surfactants such as cyclic amines, ester amides, quaternary ammonium salts, hydantoin derivatives, heterocyclic compounds, phosphoniums and sulfoniums; anionic surfactants having an acidic group such as carboxylic acid, sulfonic acid or sulfuric acid ester group; and amphoteric surfactants such as amino acids, aminosulfonic acids, sulfuric and phosphoric acid esters of aminoalcohols and alkylbetaines may also be used. These surfactants are described in detail in Kaimen Kasseizai Binran published by Sangyo Tosho K.K.

These lubricants, antistatic agents, etc. need not necessarily be pure, and may contain impurities such as isomers, unreacted materials, by-products, decomposition products and oxides. The content of the impurities be preferably 30% by weight or less, more preferably 10% by weight or less.

Specific examples of these additives include NAA-102, hydrogenated castor oil fatty acid, NAA-42, Cation SA, Nymeen L-201, Nonion E-208, Anon BF and Anon LG (manufactured by Nippon Yushi K.K.); FAL-205 and FAL-123 (manufactured by Takemoto Oil & Fat Co., Ltd.); NJLUB OL (manufactured by New Japan Chemical Co., Ltd.); TA-3 (manufactured by Shin-Etsu Chemical Co., Ltd.); Armide P (manufactured by Lion Armour Co., Ltd.); Duomine TDO (manufactured by Lion Corporation); BA-41G (manufactured by Nisshin Oil Mills, Ltd.); and Profan 2012E, Newpole PE61 and Ionet MS-400 (manufactured by Sanyo Chemical Industries, Ltd.).

Further, to the magnetic layer in the invention may be added carbon black as needed. Examples of the carbon black that can be used in the magnetic layer include furnace black for rubber, thermal black for rubber, carbon black for color and acetylene black. The preferred carbon black has a specific surface area of from 5 to 500 $m^2/g$, a DBP absorptive capacity of from 10 to 400 ml/100 g, an average particle size of from 5 to 300 nm, a pH of from 2 to 10, a water content of from 0.1 to 10%, and a tap density of from 0.1 to 1 g/ml.

Specific examples of carbon black to be used in the invention include BLACKPEARLS 2000, 1300, 100.0, 900, 905, 800, 700, VULCAN XC-72 [products of Cabot Co.]; #80, #60, #55, #50 and #35 [products of Asahi Carbon Co., Ltd.], #2400B, #2300, #900, #1000, #30, #40 and #10B [products of Mitsubishi Chemical Corporation]; CONDUCTEX SC, RAVEN150, 50, 40, 15 and RAVEN-MT-P [products of Colombian Carbon Co.]; and KEETJENBLACK EC [product of Nippon EC]. Carbon black may be surface-treated with a dispersing agent or may be grafted with a resin, or carbon black surface may be partly converted to graphite before use. Also, in advance of its addition to a magnetic coating composition, carbon black may be dispersed into a binder. These carbon black products can be used independently or in combination thereof. In using carbon black, it is preferably used in an amount of from 0.1 to 30% by weight based on the weight of the magnetic powder. In the magnetic layer, carbon black functions to prevent static, reduce the coefficient of friction, impart light-blocking properties and enhance film strength, which varies depending upon kind of the carbon black employed. Accordingly, the kind, quantity, and combination of the carbon blacks may be determined separately for the magnetic layer and the non-magnetic layer based on the various characteristics described above, such as particle size, oil absorption capacity, electrical conductivity, and pH depending upon the object, or rather be optimized for each layer. As to carbon blacks which can be used in the magnetic layer of the invention, reference can be made to, for example, Carbon Black Binran compiled by the Carbon Black Association.

As organic solvents to be used in the invention, known ones can be used. The organic solvent employed in the invention may be used in any ratio. Examples thereof include ketones such as acetone, methyl ethyl ketone, methyl isobutyl ketone, diisobutyl ketone, cyclohexanone, isophorone and tetrarydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane.

These organic solvents need not be 100% pure and may contain impurities such as isomers, unreacted materials, by-products, decomposition products, oxides and moisture in addition to the major components. The content of these impurities is preferably 30% or less, more preferably 10% or less. Preferably the same type of organic solvents be used as the organic solvents in the invention in both the magnetic layer and the non-magnetic layer. However, the addition amount may be varied. The stability of coating is increased by using a solvent with a high surface tension (such as cyclohexanone or dioxane) in the non-magnetic layer. Specifically, it is important that the arithmetic mean value of the upper layer solvent composition be not less than the arithmetic mean value of the non-magnetic layer solvent composition. To improve dispersion properties, a solvent having a somewhat strong polarity is preferred. Of the solvent compositions, a solvent composition containing a solvent having a dielectric constant of 15 or more in a content of 50% or more is preferred. Further, the dissolution parameter is preferably from 8 to 11.

Different types and quantities of these dispersants, lubricants and surfactants to be used in the invention may be used as needed in the magnetic layer and the non-magnetic layer. Needless to say, the examples given here are not to be construed as limitative. The dispersant exhibits adsorptive or bonding properties through the polar groups, adsorbing or binding by means of the polar groups chiefly to the surface of the hexagonal ferrite magnetic powder in the magnetic layer and chiefly to the surface of the non-magnetic powder in the nonmagnetic layer. It is surmised that the organic phosphorus compound once having adsorbed difficultly desorbs from the surface of a metal or metallic compound. Accordingly, since the surface of the hexagonal ferrite magnetic powder of the invention or the surface of the non-magnetic powder is coated with alkyl groups or aromatic groups, affinity of the hexagonal ferrite magnetic powder or the non-magnetic powder for the binder resin component increases, and the dispersion stability of the hexagonal ferrite magnetic powder or the non-magnetic powder improves. Further, since lubricants are present in a free state, it is conceivable to employ fatty acids having different melting points in the non-magnetic layer and magnetic layer to control seepage out onto the surface, employ esters having different melting points and polarities to control seepage out onto the surface, adjust the quantity of surfactant to improve the stability of the coating, and increase the quantity of lubricant in the non-magnetic layer to improve the lubricating effect. Also, all or a portion of the additives employed in the invention may be added during any step in the manufacturing of the coating liquid for the magnetic layer or the non-magnetic layer. For example, there are cases where additives are admixed with the ferromagnetic powder prior to the kneading step, cases where they are added during the step of kneading the ferromagnetic powder, binder and solvent, cases where they are added during the dispersion step, cases where they are added following dispersion, and cases where they are added immediately before coating.

Non-Magnetic Layer

Next, the non-magnetic layer is described in detail. The magnetic recording medium of the invention can have a non-magnetic layer, formed on a support, which contains a binder and a non-magnetic powder. The non-magnetic powder to be used in the non-magnetic layer may be of an inorganic or organic substance. Carbon black may also be employed. Examples of the inorganic substance include metals, metal oxides, metal carbonates, metal sulfates, metal nitrides, metal carbides and metal sulfides.

Specifically, titanium oxides such as titanium dioxide, cerium oxide, tin oxide, tungsten oxide, ZnO, ZArO2, SiO2, Cr2O3, α-alumina with an α-conversion ratio of 90 to 100%, β-alumina, γ-alumina, α-iron oxide, goethite, corundum, silicon nitride, titanium carbide, magnesium oxide, boron nitride, molybdenum disulfite, copper oxide, $MgCO_3$, $CaCO_3$, $BaCO_3$, $SrCO_3$, $BaSO_4$, silicon carbide and titanium carbide can be used independently or in combination of two or more thereof. Of these, α-iron oxide and titanium oxide are preferred.

As to the shape of the non-magnetic powder, it may be acicular, spherical, polyhedral or tabular. The crystallite size of the non-magnetic powder is preferably from 4 nm to 1 µm, more preferably from 40 to 100 nm. A crystallite size falling within the range of 4 nm to 1 µm is preferred in that it facilitates dispersion and imparts a suitable surface roughness. The preferred average particle size of the non-magnetic powder ranges from 5 nm to 2 µm. It is also possible to combine, as needed, non-magnetic powders different in the average particle size or, in the case of using a single non-magnetic powder, to broaden the particle size distribution to thereby obtain the same effect. A particularly preferred average particle size of the non-magnetic powder ranges from 10 to 200 nm. Within a range of 5 nm to 2 µm, dispersion is good and good surface roughness is achieved, thus such average particle size being preferred.

The specific surface area of the non-magnetic powder is preferably from 1 to 100 $m^2/g$, more preferably from 5 to 70 $m^2/g$, still more preferably from 10 to 65 $m^2/g$. Within the specific surface area ranging from 1 to 100 $m^2/g$, suitable surface roughness is achieved and dispersion is possible with the desired quantity of binder, thus such specific surface area being preferred. The oil absorption capacity measured by using dibutyl phthalate (DBP) ranges from 5 to 100 ml/100 g, preferably from 10 to 80 ml/100 g, more preferably from 20 to 60 ml/100 g. The specific gravity ranges from 1 to 12, preferably from 3 to 6. The tap density ranges from 0.05 to 2 g/ml, preferably from 0.2 to 1.5 g/ml. A tap density falling within a range of 0.05 to 2 g/ml reduces the amount of scattering particles, thereby facilitating handling, and tends to prevent deposition of the particles onto the device. The pH of the non-magnetic powder is preferably from 2 to 11, particularly preferably from 6 to 9. When the pH falls within a range of 2 to 11, the coefficient of friction does not become high at a high temperature or under a high humidity or due to liberation of fatty acids. The moisture content of the non-magnetic powder ranges from 0.1 to 5% by weight, preferably from 0.2 to 3% by weight, still more preferably from 0.3 to 1.5% by weight. A moisture content falling within a range of 0.1 to 5% by weight is preferred because it produces good dispersion and yields a stable coating viscosity following dispersion. An ignition loss of 20% by weight or less is preferred, with non-magnetic powders having a low ignition loss being preferred.

When the non magnetic powder is an inorganic powder, the Mohs' hardness thereof is preferably 4 to 10. Durability can be ensured if the Mohs' hardness ranges from 4 to 10. The stearic acid adsorption capacity of the non-magnetic powder ranges preferably from 1 to 20 µmol/$m^2$, more preferably from 2 to 15 µm/$m^2$. The heat of wetting in 25° C. water of the non-magnetic powder is preferably within the range of from 200 to 600 erg/$cm^2$ (200 to 600 mJ/$m^2$). A solvent with a heat of wetting in this range may be used. The quantity of water molecules on the surface at 100 to 400° C. suitably ranges from 1 to 10 molecules per 100 Å. The pH of the isoelectric point in water preferably ranges from 3 to 9. The surface of these non-magnetic powders is preferably subjected to surface treatment for $Al_2O_3$, $SiO_2$, $TiO_2$, $ZrO_2$, $SnO_2$, $Sb_2O_3$ or ZnO to exist on the surface. Of these, $Al_2O_3$, $SiO_2$, $TiO_2$ and $ZrO_2$ are preferred in view of dispersibility, with $Al_2O_3$, $SiO_2$ and $ZrO_2$ being more preferred. These may be used in combination or independently. Depending on the object, a surface treatment coating layer formed by co-precipitation may also be employed. It is also employable to first treat with alumina and then treat the surface layer with silica or to treat in the reverse order. Depending on the object, the surface treatment coating layer may be a porous layer, with a homogeneous and dense layer being generally preferred.

Specific examples of the non-magnetic powder to be used in the non-magnetic layer of the invention include Nanotite manufactured by Showa Denko K.K.; DPN-250, DPN-250BX, DPN-245, DPN-270BX, DPB-550BX and DPN-550RX manufactured by Toda Kogyo Corp.; titanium oxide TTO-51B, TTO-55A, TTO-55B, TTO-55C, TTO-55S, TTO-55D, SN-100, MJ-7, α-iron oxide E270, E271 and E300 manufactured by Ishihara Sangyo Co., Ltd.; STT-4D, STT-30D, STT-30 and STT-65C manufactured by Titan Kogyo K.K.; and MT-100S, MT-100T, MT-150W, MT-500B, T-600B, T-100F and T-500HD manufactured by Tayca Corporation. Further, there are illustrated FINEX-25, BF-1, BF-10, BF-20 and ST-M manufactured by Sakai Chemical Industry Co., Ltd.; DEFIC-Y and DEFIC-R manufactured by Dowa Mining Co., Ltd.; 100A and 500A manufactured by Ube Industries, Ltd.; Y-LOP manufactured by Titan Kogyo K.K.; and sintered products thereof. Particularly preferred non-magnetic powders are titanium dioxide and α-iron oxide.

In the non-magnetic layer, carbon black may be mixed with the non-magnetic powder to decrease surface resistivity and transmittance of light and achieve the desired micro Vicker's hardness. The micro Vicker's hardness normally ranges from 25 to 60 kg/$mm^2$ (from 245 to 588 MPa), preferably from 30 to 50 kg/$mm^2$ (from 294 to 490 MPa) to adjust head touch. It can be measured by means of a thin-film hardness meter (HMA-400; manufactured by NEC Corporation) using a triangular diamond indenter tip with a front end radius of 0.1 µm and an edge angle of 800. The transmittance of light is generally standardized to be 3% or less in terms of absorption of infrared rays having a wavelength of about 900 nm, for example, 0.8% or less for a VHS magnetic tape. For such purposes, furnace black for rubber, thermal black for rubber, black for coloring and acetylene black may be used.

The specific surface area of carbon black to be used in the non-magnetic layer of the invention ranges from 100 to 500 m²/g, preferably from 150 to 400 m²/g, and the DBP oil absorption capacity ranges from 20 to 400 ml/100 g, preferably from 30 to 200 ml/100 g. The particle size of the carbon black ranges from 5 to 80 nm, preferably from 10 to 50 nm, more preferably from 10 to 40 nm. The pH of the carbon black preferably ranges from 2 to 10, the moisture content preferably ranges from 0.1 to 10%, and the tap density preferably ranges from 0.1 to 1 g/ml.

Specific examples of carbon black to be used in the non-magnetic layer of the invention include BLACK-PEARLS 2000, 1300, 1000, 900, 800, 880, 700 and VULCAN C-72 manufactured by Cabot Corporation; #3050B, #3150B, #3250B, #3950B, #950, #650B, #970B, #850B and MA-600 manufactured by Mitsubishi Chemical Corporation; CONDUCTEX SC, RAVEN8800, 8000, 7000, 5750, 5250, 3500, 2100, 2000, 1800, 1500, 1255 and 1250 manufactured by Columbia Carbon Co., Ltd.; and Ketjen Black EC manufatucured by Akzo Co.

Also, carbon black may be surface-treated with a dispersing agent or may be grafted with a resin, or carbon black surface may be partly converted to graphite before use. Further, in advance of its addition to a coating composition, carbon black may be dispersed into a binder. These carbon black products may be used in an amount not exceeding 50% by weight based on the weight of the inorganic powder and not exceeding 40% by weight based on the whole weight of the non-magnetic layer. These carbon black products can be used independently or in combination thereof. As to carbon blacks which can be used in the non-magnetic layer of the invention, reference can be made to, for example, Carbon Black Binran compiled by the Carbon Black Association.

To the non-magnetic layer, organic powder can also be added, as needed depending upon the object. Examples of such organic powder include acrylic-styrene resin powder, benzoquanamine resin powder, melamine resin powder and phthalocyanine-based pigment. Further, polyolefin resin powder, polyester resin powder, polyamide resin powder, polyimide resin powder and polyfluoroethylene resin may be used. As to methods for their production, those which are described in JP-A-62-18564 and JP-A-60-255827 may be employed.

As binder resins, lubricants, dispersants, additives and dispersing methods, those for the magnetic layer can be applied. In particular, as to the amount and kind of binder resins and the amount and kind of additives and dispersants, known techniques relating to the magnetic layer can be applied.

The magnetic recording medium of the invention may have an undercoat layer. The undercoat layer serves to improve the adhesion force between the support and the magnetic layer or the non-magnetic layer. As the undercoat layer, a polyester resin soluble in the solvent is used.

Layer Structure

In the magnetic recording medium of the invention, the thickness of the support is preferably from 3 to 80 μm. Further, when providing an undercoat layer between the support and the non-magnetic layer or the magnetic layer, the thickness of the undercoat layer is from 0.01 to 0.8 μm, preferably from 0.02 to 0.6 μm.

The thickness of the magnetic layer is optimized based on the saturated magnetization level and head gap length of the magnetic head employed and the recording signal band, but is generally from 10 to 150 nm, preferably from 20 to 80 nm, more preferably from 30 to 80 nm. Further, the thickness fluctuation ratio of the magnetic layer is preferably within ±50%, more preferably within ±40%. The magnetic layer comprises at least one layer, but may be separated into two or more layers having different magnetic characteristics. Known multi-layered magnetic layer configurations may be employed.

The thickness of the non-magnetic layer is from 0.5 to 2.0 μm, preferably from 0.8 to 1.5 μm, more preferably from 0.8 to 1.2 μm. Additionally, the non-magnetic layer of the magnetic recording medium of the invention can exhibit its effect so long as it is essentially non-magnetic. For example, even when an impurity or an intentional trace amount of magnetic material is contained, the effect of the invention is exhibited by such essentially non-magnetic layer and the configuration can be seen as being essentially identical to that of the magnetic recording medium of the invention. Additionally, the term "essentially identical" as used herein means that the residual magnetic flux density of the non-magnetic layer is 10 mT or less or the coercive force is 7.96 kA/m (100Oe) or less, with the absence of residual magnetic flux density and coercive force being preferred.

Manufacturing Method

The process of manufacturing the coating composition to be used in the invention for forming the magnetic layer of the magnetic recording medium comprises at least a kneading step, dispersion step, and mixing steps provided as needed before and after these steps. Each of the steps may be divided into two or more stages. All of the starting materials employed in the invention, including the hexagonal ferrite magnetic powder, the non-magnetic powder, the binder, carbon black, the abrasive, the antistatic agent, the lubricant and the solvent may be added at the beginning or during any step. Further, each of the starting materials may be divided and added during two or more steps. For example, polyurethane may be divided and added in the kneading step, dispersing step and mixing step for viscosity adjustment after dispersion. In order to achieve the object of the invention, conventionally known manufacturing techniques may be employed for some of the steps. A kneading device of high kneading strength, such as an open kneader, continuous kneader, pressure kneader or extruder, is preferably used in the kneading step. Details of these kneading treatments are described in JP-A-1-106338 and JP-A-1-79274. Further, glass beads may be employed to disperse the magnetic layer-forming coating composition and the non-magnetic layer-forming coating composition. A dispersion medium having a high specific gravity such as zirconia beads, titania beads or steel beads is suitable for use as the glass beads. The particle size and the packing ratio of the dispersion medium are optimized for use. As a dispersing machine, any known dispersing machine may be used.

In the method of manufacturing the magnetic recording medium of the invention, the magnetic layer is formed by coating a magnetic layer-forming coating composition on the surface of a running support in a predetermined thickness. Here, a plurality of magnetic layer-forming coating compositions may be sequentially or simultaneously multi-layer coated, and the non-magnetic layer-forming coating composition and the magnetic layer-forming coating composition may be sequentially or simultaneously multi-layer coated. As coating machines suited for use in coating the magnetic layer-forming coating composition and the non-magnetic layer forming coating composition, an air doctor coater, a blade coater, a rod coater, an extrusion coater, an air knife coater, a squeeze coater, an immersion coater, a reverse roll coater, a transfer roll coater, a gravure coater, a kiss coater, a cast coater, a spray coater and a spin coater can be used. As to these coating machines, reference can be made to, for example, Saishin Coating Gijutsu (May 31, 1983), issued by K.K. Sogo Gijutsu Center.

With a magnetic tape, the layer formed by coating the magnetic layer-forming coating composition is subjected to the orientation treatment in the longitudinal direction by applying a cobalt magnet or solenoid to the hexagonal ferrite magnetic powder contained in the magnetic layer-forming coating composition. With a disk, although isotropic orientation can be sufficiently achieved in some cases without orientation using an orientation device, the positioning of cobalt magnets at mutually oblique angles or the use of a known random orientation device such as the application of an alternating current magnetic field with solenoids is preferably employed. With a hexagonal ferrite magnetic powder, the term "isotropic orientation" generally preferably means two-dimensional in-plane randomness, but can also mean three-dimensional randomness when a vertical component is imparted. With the hexagonal ferrite, three-dimensional randomness in the in-plane and vertical directions is generally readily achieved, but two-dimensional in-place randomness is also possible. Also, a known technique such as opposed magnets with different poles may be employed to impart isotropic magnetic characteristics in a circumferential direction using a vertical orientation. Vertical orientation is particularly preferred in the case of conducting high-density recording. Further, spin coating may be employed to achieve circumferential orientation.

It is preferred to control the drying position of the coated film by controlling the temperature and flow rate of drying air and the coating rate. The coating rate is preferably from 20 m/min to 1,000 m/min, and the temperature of the drying air is preferably 60° C. or higher.

Following drying, a surface smoothening treatment is applied to the coated layer. In the surfaced smoothening treatment, there may be utilized, for example, supercalender rolls. The surface smoothening treatment eliminates voids produced by the removal of solvent during drying and improves the packing ratio of the hexagonal ferrite magnetic powder in the magnetic layer, making it possible to obtain a magnetic recording medium having high electromagnetically transducing characteristics. As calender-processing rolls, rolls of heat-resistant plastics such as epoxy, polyimide, polyamide and polyamidimide are used. It is also possible to process with metal rolls.

The surface of the magnetic recording medium of the invention preferably has an extremely excellent smoothness of 0.1 to 4 nm, preferably 1 to 3 nm, in terms of center-line average surface roughness (cut-off value: 0.25 mm). Such surface roughness is obtained by the method of, for example, subjecting the magnetic layer formed by selecting the specific hexagonal ferrite magnetic powder and the binder as described hereinbefore to the above-mentioned calender processing. Calender processing conditions are: 60 to 100° C., preferably 70 to 100° C., particularly preferably 80 to 100° C., in temperature; and 100 to 500 kg/cm (98 to 490 kN/m), preferably 200 to 450 kg/cm (196 to 441 kN/m), particularly preferably 300 to 400 kg/cm (294 to 392 kN/m), in pressure.

In the case where the magnetic recording medium of the invention is a magnetic tape, Hc (in the longitudinal direction) is preferably 167 to 350 kA/m (more preferably 180 to 340 kA/m, particularly preferably 200 to 320 kA/m), SQ (squareness ratio) is preferably 0.50 to 0.80 (more preferably 0.60 to 0.80, particularly preferably 0.65 to 0.80), and Bm (maximum magnetic flux density) is preferably 1,000 to 2,000 mT (more preferably 1,200 to 2,000 mT, particularly preferably 1,500 to 2,000).

In the case where the magnetic recording medium of the invention is a magnetic disk, Hc (in-plane) is preferably 160 to 350 kA/m (more preferably 180 to 340 kA/m, particularly preferably 200 to 320 kA/m), SQ (squareness ratio) is preferably 0.40 to 0.60 (more preferably 0.45 to 0.60, particularly preferably 0.50 to 0.60), and Bm (maximum magnetic flux density) is preferably 1,000 to 2,000 mT (more preferably 1,200 to 2,000 mT, particularly preferably 1,500 to 2,000).

The resulting magnetic recording medium can be cut into a desired size for use by using a cutting machine. Such cutting machine is not particularly limited, but those wherein plural sets of a rotating upper blade (male blade) and a lower blade (female blade) are provided are preferred. The slitting speed, depth of engagement of the blades, ratio of the peripheral speed of the upper blade (male blade) to the peripheral speed of the lower blade (female blade) (upper blade peripheral speed/lower blade peripheral speed) and time of continuously using the slitting blades are properly selected.

Physical Properties

The coefficient of friction of the magnetic recording medium of the invention with the head is preferably 0.5 or less, preferably 0.3 or less, over a temperature range of −10 to 40° C. and a humidity range of 0 to 95%. The intrinsic surface resistivity is preferably from $10^4$ to $10^{12}$ Ω/sq on the magnetic surface, and the charge potential is preferably within the range of −500 V to +500 V. The modulus of elasticity of the magnetic layer at an elongation of 0.5% is preferably from 0.98 to 19.6 GPa (from 100 to 2,000 kg/mm$^2$) in all in-plane directions, and the breaking strength is preferably from 98 to 686 MPa (from 10 to 70 kg/mm$^2$). The modulus of elasticity of the magnetic recording medium is preferably from 0.98 to 14.7 GPa (from 100 to 1,500 kg/mm$^2$), the residual elongation is preferably 0.5% or less, the thermal shrinkage rate at any temperature equal to or less than 100° C. is preferably 1% or less, more preferably 0.5% or less, most preferably 0.1% or less.

The glass transition temperature of the magnetic layer (the peak loss elastic modulus of dynamic viscoelasticity measured at 110 Hz) is preferably from 50 to 180° C., and that of the non-magnetic layer is preferably from 0 to 180° C. The loss elastic modulus falls within the range of $1\times10^7$ to $8\times10^8$ Pa ($1\times10^8$ to $8\times10^9$ dyne/cm$^2$) and the loss tangent is preferably 0.2 or less. A too large loss tangent tends to cause an adhesion trouble. These thermal and mechanical characteristics are preferably identical within 10% in all in-plane directions of the medium.

The residual solvent contained in the magnetic layer is preferably 100 mg/m$^2$ or less, more preferably 10 mg/m$^2$ or less. The void ratio of the coated layer is preferably 30% by volume or less, more preferably 20% by volume or less in both the non-magnetic and magnetic layers. A smaller void ratio is preferred to achieve a high output, but there are cases where ensuring a certain value is good. For example, with a disk medium in which repeated uses are important, a high void ratio is often preferred for running durability.

The maximum height $SR_{max}$ of the magnetic layer is preferably 0.5 μm or less, the ten-point average roughness SRz is preferably 0.3 μm or less, the center surface peak SRp is preferably 0.3 μm or less, the center surface valley depth SRv is preferably 0.3 µm or less, the center surface surface area ratio SSr is preferably from 20 to 80%, and the average wavelength Sλa is preferably from 5 to 300 µm. These can readily be controlled by controlling the surface properties by means of fillers employed in the support and the surface shape of the rolls employed in calendering. Curling is preferably within ±3 mm.

When the magnetic recording medium of the invention is constituted by the non-magnetic layer and the magnetic layer, it is possible to vary the physical characteristics between the non-magnetic layer and the magnetic layer depending upon the object. For example, while increasing the modulus of elasticity of the magnetic layer to improve running durability, it is possible to make the modulus of elasticity of the non-magnetic layer lower than that of the magnetic layer to improve contact between the magnetic recording medium and the head.

EXAMPLES

The invention is described in more detail below by reference to Examples and Comparative Examples which, however, do not limit the invention.

Examples 1 to 8 and Comparative Examples 1 to 9

Preparation of Hexagonal Ferrite Magnetic Powder

In order to obtain an amorphous product comprising 31 mol % of BaO, 31 mol % of $B_2O_3$ and 38 mol % of a Ba ferrite component represented by the composition formula of $BaO \cdot Fe_{12-3(x+y)/2}Co_xZn_yNb_{(x+y)/2}O_{18}$, starting materials corresponding respective elements were weighed and well mixed. The resulting mixture was put in a platinum crucible and molten at a temperature of 1350° C. by means of a high-frequency heating furnace. After melting all of the starting materials, the molten mixture was stirred for 1 hour to homogenize. The thus-homogenized molten product was poured onto a water-cooled twin rollers rotating at a high speed to thereby mill and quench, thus an amorphous product being obtained. The resultant amorphous product was heated from ordinary temperature to 550° C. in 5 hours, then heated at a rate shown in Table 1 in the temperature region ranging from 550° C. to 600° C. to a predetermined crystallization temperature, followed by conducting crystallization for 5 hours to precipitate Ba ferrite crystals. The crystallized product was pulverized for enhancing the efficiency of treatment with an acid, then acid-treated in a 10% acetic acid solution for 4 hours under stirring while controlling the solution temperature at 80° C. or above to thereby dissolve a glass component of $BaO-B_2O_3$. After repeatedly conducting washing with water, the slurry was dried to obtain a magnetic powder.

Characteristic properties of the thus-obtained magnetic powder are shown in Table 1.

The magnetic characteristics and SFD were measured by means of a vibrating sample magnetometer (VSM) under the condition of 10 KOe in maximum field with making sample-packing density to 1.39 to 1.44 g/cm³.

The specific surface area was measured according to the BET single-point method under degassing conditions of 350° C. and 15 minutes.

As to the average tabular diameter, a powder sample was photographed at an arbitrarily selected position under a transmission electron microscope (300,000 to 500,000×), and 300 particles whose side was photographed were arbitrarily selected, followed by measuring their sizes.

As to D50 and D70, the particle size is plotted as abscissa, and the cumulative number of particles belonging to a given section is plotted as ordinate on a logarithmic probability paper, with D50 and D70 being read from the cumulative number of particles % for each section.

TABLE 1

(A)

| Example | x | y | Crystallization Temperature ° C. | Temperature-increasing rate ° C./hr | Average Particle Size nm |
|---|---|---|---|---|---|
| Example 1 | 0.1 | 0.35 | 660 | 300 | 22 |
| Example 2 | 0.1 | 0.3 | 660 | 300 | 21 |
| Example 3 | 0.1 | 0.25 | 660 | 300 | 22 |
| Comparative Example 1 | 0.1 | 0.35 | 660 | 100 | 20 |
| Comparative Example 2 | 0.1 | 0.3 | 660 | 100 | 19 |
| Comparative Example 3 | 0.1 | 0.25 | 660 | 100 | 20 |
| Comparative Example 4 | 0.1 | 0.35 | 800 | 700 | 42 |
| Example 4 | 0.1 | 0.3 | 660 | 450 | 26 |
| Comparative Example 5 | 0.1 | 0.35 | 750 | 550 | 35 |
| Comparative Example 6 | 0.1 | 0.35 | 660 | 250 | 22 |
| Comparative Example 7 | 0.1 | 0.35 | 600 | 300 | 13 |
| Example 5 | 0.1 | 0.1 | 640 | 300 | 18 |
| Example 6 | 0.1 | 0.4 | 720 | 300 | 26 |
| Comparative Example 8 | 0.1 | 0.35 | 770 | 300 | 30 |
| Comparative Example 9 | 0.1 | 0.6 | 710 | 300 | 23 |
| Example 7 | 0.1 | 0.1 | 710 | 300 | 24 |
| Example 8 | 0.1 | 0 | 710 | 300 | 24 |

(B)

| Example | D70/D50 | Hc Oe | Hc kA/m | SFD | σs A·m²/kg | Specific Surface Area m²/g |
|---|---|---|---|---|---|---|
| Example 1 | 1.13 | 2230 | 178 | 0.6 | 53 | 61 |
| Example 2 | 1.15 | 2470 | 198 | 0.55 | 53 | 62 |
| Example 3 | 1.2 | 2670 | 214 | 0.53 | 52 | 64 |
| Comparative Example 1 | 1.26 | 1970 | 158 | 0.88 | 53 | 64 |
| Comparative Example 2 | 1.27 | 2330 | 186 | 0.75 | 50 | 63 |
| Comparative Example 3 | 1.29 | 2500 | 200 | 0.71 | 50 | 66 |
| Comparative Example 4 | 1.3 | 2690 | 215 | 0.55 | 58 | 40 |
| Example 4 | 1.21 | 2300 | 184 | 0.5 | 53 | 62 |
| Comparative Example 5 | 1.29 | 2500 | 200 | 0.6 | 56 | 47 |
| Comparative Example 6 | 1.27 | 2100 | 168 | 0.77 | 52 | 64 |
| Comparative Example 7 | 1.24 | 860 | 69 | 4.4 | 37 | 86 |
| Example 5 | 1.16 | 3000 | 240 | 0.6 | 47 | 74 |
| Example 6 | 1.14 | 2450 | 196 | 0.42 | 55 | 49 |
| Comparative Example 8 | 1.23 | 3100 | 248 | 0.45 | 58 | 43 |
| Comparative Example 9 | 1.17 | 1900 | 152 | 0.8 | 51 | 54 |
| Example 7 | 1.18 | 3500 | 280 | 0.39 | 50 | 52 |
| Example 8 | 1.18 | 4000 | 320 | 0.35 | 50 | 52 |

Preparation of a Coating Composition for Tape

Coating Composition for Forming a Magnetic Layer

| | |
|---|---|
| Barium ferrite magnetic powder | 100 parts |
| Polyurethane resin | 12 parts |
| weight-average molecular weight: 10,000 | |
| sulfonic acid functional group: 0.5 meq/g | |
| α-Alumina | 8 parts |
| HIT60 (manufactured by Sumitomo Chemical) | |
| Carbon black (particle size: 0.015 μm) | 0.5 part |
| #55 (manufactured by Asahi Carbon) | |
| Stearic acid | 0.5 part |
| Butyl stearate | 2 parts |
| Methyl ethyl ketone | 180 parts |
| Cyclohexanone | 100 parts |

Coating Composition for Forming a Non-Magnetic Layer

| | |
|---|---|
| Non-magnetic powder, α-iron oxide | 100 parts |
| Average major axis length: | 0.09 μm; |
| Specific surface area by the BET method: | 50 m$^2$/g |
| pH: 7 | |
| DBP oil absorption capacity: | 27 to 38 ml/100 g |
| Surface treatment layer Al$_2$O$_3$: | 8% by weight |
| Carbon black Conductex SC-U (manufactured by Colombian Carbon Co.) | 25 parts |
| Vinyl chloride copolymer MR104 (manufactured by Nippon Zeon Co., Ltd.) | 13 parts |
| Polyurethane resin UR8200 (manufactured by Toyobo Co., Ltd.) | 5 parts |
| Phenylphosphonic acid | 3.5 parts |
| Butyl stearate | 1 part |
| Stearic acid | 2 parts |
| Methyl ethyl ketone | 205 parts |
| Cyclohexanone | 135 parts |

Method for Preparing a Magnetic Tape

Individual components for each coating composition were kneaded in a kneader. Each of the resulting coating compositions was introduced into a horizontal sand mill retaining 1.0-mmφ zirconia beads in an amount of 65% based on the volume of the dispersing zone thereof using a pump, and dispersed for 120 minutes (time during which the composition substantially stayed in the dispersing zone) at 2,000 rpm. To the resulting dispersion of the non-magnetic layer-forming coating composition was added 5.0 parts of polyisocyanate, and to the resulting dispersion of the magnetic layer-forming coating composition was added 2.5 parts of the polyisocyanate. Further, 3 parts of methyl ethyl ketone was added to each coating composition, and each of the resulting coating compositions was filtered through a filter of 1 μm in average pore size. Thus, there were prepared a coating composition for forming a non-magnetic layer and a coating composition for forming a magnetic layer.

The thus-obtained coating composition for forming the non-magnetic layer was coated on a 4 μm thick polyethylene terephthalate base in a dry thickness of 1.5 μm and, after drying, the coating composition for forming the magnetic layer was successively multi-layer coated in a thickness of the magnetic layer of 0.10 μm and, while the magnetic layer was still in a wet state, the orientation was performed by means of a cobalt magnet having a magnetic force of 6,000 G (600 mT) and a solenoid having a magnetic force of 6,000 G, followed by drying. Subsequently, calendering was conducted using a 7-stage calender at a temperature of 90° C. and a linear pressure of 300 kg/cm (294 kN/m). Then, a 0.5-μm thick backcoat layer (prepared by dispersing 100 parts of carbon black of 17 nm in average particle size, 80 parts of calcium carbonate of 40 nm in average particle size and 5 parts of α-alumina of 200 nm in average particle size were dispersed in nitrocellulose resin, polyurethane resin and polyisocyanate) was coated. The resulting web-shaped magnetic recording medium was slit into 3.8 mm-wide product. The slit product was then subjected to surface-cleaning treatment by means of a tape-cleaning device provided in an apparatus having a tape delivery mechanism and a tape wind-up mechanism, wherein non-woven fabric and a razor blade are provided so as to be pressed against the magnetic surface. Thus, a magnetic tape medium was obtained.

Magnetic characteristics of the thus-obtained magnetic tapes were examined as described above. Also, output and noise were checked. These were measured by fitting a recording head (MIG; gap: 0.15 μm; 1.8 T) and an AMR head for reproduction to a drum tester. The head-medium relative speed was adjusted to 15 m/sec, and noise was measured in terms of modulated noise. SN was given with SN in Comparative Example 4 as 0 dB.

The results are shown in Table 2. Additionally, in Table 2, numbers of Examples and Comparative Examples correspond to the numbers of Examples and Comparative Examples of magnetic powders shown in Table 1.

TABLE 2

| | Hc | | | | Bm | Output | Noise | S/N |
|---|---|---|---|---|---|---|---|---|
| Example | Oe | kA/m | SQ | SFD | mT | dB | dB | dB |
| Example 1 | 2380 | 190.4 | 0.62 | 0.4 | 149 | −1.8 | −4.2 | 2.4 |
| Example 2 | 2630 | 210.4 | 0.6 | 0.38 | 148 | −1.3 | −4.3 | 3.1 |
| Example 3 | 2830 | 226.4 | 0.62 | 0.37 | 147 | −1.1 | −4.1 | 3.0 |
| Comparative Example 1 | 2100 | 168 | 0.58 | 0.54 | 148 | −3.4 | −4.7 | 1.3 |
| Comparative Example 2 | 2480 | 198.4 | 0.56 | 0.48 | 140 | −3.3 | −4.2 | 0.9 |
| Comparative Example 3 | 2660 | 212.8 | 0.58 | 0.46 | 139 | −2.9 | −4.4 | 1.5 |
| Comparative Example 4 | 2850 | 228 | 1.02 | 0.38 | 164 | 0.0 | 0.0 | 0.0 |
| Example 4 | 2450 | 196 | 0.7 | 0.35 | 151 | −1.2 | −3.3 | 2.2 |
| Comparative Example 5 | 2660 | 212.8 | 0.88 | 0.4 | 159 | −0.9 | −1.5 | 0.6 |
| Comparative Example 6 | 2240 | 179.2 | 0.62 | 0.49 | 147 | −2.9 | −4.3 | 1.4 |
| Comparative Example 7 | 890 | 71.2 | 0.44 | 2.3 | 105 | −9.8 | −4.3 | −5.5 |
| Example 5 | 3170 | 253.6 | 0.54 | 0.4 | 133 | −2.1 | −5.0 | 2.9 |
| Example 6 | 2600 | 208 | 0.7 | 0.31 | 156 | −0.2 | −3.2 | 3.0 |
| Comparative Example 8 | 3230 | 258.4 | 0.78 | 0.33 | 162 | 0.0 | −1.2 | 1.2 |
| Comparative Example 9 | 2040 | 163.2 | 0.64 | 0.5 | 142 | −3.5 | −4.1 | 0.7 |
| Example 7 | 3690 | 295.2 | 0.66 | 0.3 | 143 | 0.0 | −3.6 | 3.6 |
| Example 8 | 4200 | 336 | 0.66 | 0.28 | 144 | −0.1 | −3.5 | 3.4 |

Results of Evaluating the Magnetic Tape Media

It is seen from the results shown in Tables 1 and 2 that, in comparison with Comparative Examples, the magnetic powders in accordance with the invention showed a depressed increase in SFD even when the tabular diameter was small. It is also seen that they showed good output characteristics and low noise characteristic.

Next, magnetic disc media containing hexagonal ferrite magnetic powder of the invention in the magnetic layer were prepared.

Preparation of a Coating Composition for Disc

Coating Composition for Forming a Magnetic Layer

| | |
|---|---|
| Barium ferrite magnetic powder | 100 parts |
| Polyurethane resin | 12 parts |
| weight-average molecular weight: 10,000 | |
| sulfonic acid functional group: 0.5 meq/g | |
| Diamond fine particles | 2 parts |
| Average particle size: 0.10 μm | |
| Carbon black (particle size: 0.015 μm) | 0.5 part |
| #55 (manufactured by Asahi Carbon) | |
| Stearic acid | 0.5 part |
| Butyl stearate | 2 parts |
| Methyl ethyl ketone | 230 parts |
| Cyclohexanone | 150 parts |

Coating Composition for Forming a Non-Magnetic Layer

| | |
|---|---|
| Non-magnetic powder, α-iron oxide | 100 parts |
| Average major axis length: 0.09 μm; | |
| Specific surface area by the BET method: 50 m$^2$/g | |
| pH: 7 | |
| DBP oil absorption capacity: 27 to 38 ml/100 g | |
| Surface treatment layer Al$_2$O$_3$: 8% by weight | |
| Carbon black | 25 parts |
| Conductex SC-U (manufactured by Colombian Carbon Co.) | |
| Vinyl chloride copolymer | 13 parts |
| MR104 (manufactured by Nippon Zeon Co., Ltd.) | |
| Polyurethane resin | 5 parts |
| UR8200 (manufactured by Toyobo Co., Ltd.) | |
| Phenylphosphonic acid | 3.5 parts |
| Butyl stearate | 1 part |
| Stearic acid | 2 parts |
| Methyl ethyl ketone | 205 parts |
| Cyclohexanone | 135 parts |

Method for Preparing a Magnetic Disc

Individual components for each coating composition were kneaded in a kneader. Each of the resulting coating compositions was introduced into a horizontal sand mill retaining 11.0 mmφ zirconia beads in an amount of 65% based on the volume of the dispersing zone thereof by means of a pump, and dispersed for 120 minutes (time during which the composition substantially stayed in the dispersing zone) at 2,000 rpm. To the resulting dispersion of the non-magnetic layer-forming coating composition was added 6.5 parts of polyisocyanate, and to the resulting dispersion of the magnetic layer-forming coating composition was added 2.5 parts of the polyisocyanate. Further, 7 parts of methyl ethyl ketone was added to each coating composition, and each of the resulting coating compositions was filtered through a filter of 1 μm in average pore size. Thus, there were prepared a coating composition for forming a non-magnetic layer and a coating composition for forming a magnetic layer.

The thus-obtained coating composition for forming the non-magnetic layer was coated on a 62 μm thick polyethylene terephthalate base in a dry thickness of 1.5 μm and, after drying, the coating composition for forming the magnetic layer was successively multi-layer coated in a thickness of the magnetic layer of 0.10 μm. After drying, calendering was conducted using a 7-stage calender at a temperature of 90° C. and a linear pressure of 300 kg/cm. These procedures were conducted with both sides of the non-magnetic support. A 3.5-inch disc was punched out and subjected to surface abrasion treatment to obtain a magnetic disc medium.

With the thus obtained magnetic disc media, magnetic characteristics and noise were measured as is the same with the magnetic tape media. Additionally, output and noise were measured by fitting a recording head (MIG; gap: 0.15 μm; 1.8 T) and an AMR head for reproduction to a spin stand. The medium rotation number was 4,000 rpm, recording wavelength was 0.16 μm, and noise was measured in terms of modulated noise. SN was given with SN in Comparative Example 4 as 0 dB.

The results are shown in Table 3. Additionally, in Table 3, numbers of Examples and Comparative Examples correspond to the numbers of Examples and Comparative Examples of magnetic powders shown in Table 1.

TABLE 3

| Example | Hc | | | | Bm | Output | Noise | S/N |
|---|---|---|---|---|---|---|---|---|
| | Oe | kA/m | SQ | SFD | mT | dB | dB | dB |
| Example 1 | 2190 | 175 | 0.51 | 0.62 | 150 | −1.1 | −3.7 | 2.6 |
| Example 2 | 2380 | 190 | 0.52 | 0.59 | 151 | −0.6 | −3.8 | 3.3 |
| Example 3 | 2560 | 205 | 0.53 | 0.57 | 149 | −0.3 | −3.6 | 3.3 |
| Comparative Example 1 | 1980 | 158 | 0.49 | 0.82 | 146 | −3.3 | −4.2 | 1.0 |
| Comparative Example 2 | 2260 | 181 | 0.52 | 0.73 | 141 | −2.5 | −4.0 | 1.5 |
| Comparative Example 3 | 2400 | 192 | 0.52 | 0.7 | 142 | −2.2 | −3.7 | 1.5 |
| Comparative Example 4 | 2550 | 204 | 0.53 | 0.59 | 163 | 0.0 | 0.0 | 0.0 |
| Example 4 | 2240 | 179 | 0.51 | 0.55 | 151 | −0.3 | −2.9 | 2.6 |
| Comparative Example 5 | 2400 | 192 | 0.52 | 0.62 | 159 | −0.7 | −1.3 | 0.7 |
| Comparative Example 6 | 2090 | 167 | 0.5 | 0.74 | 149 | −2.4 | −3.8 | 1.4 |
| Comparative Example 7 | 880 | 70 | 0.31 | 3.28 | 105 | −8.5 | −5.2 | −3.3 |
| Example 5 | 2800 | 224 | 0.54 | 0.62 | 135 | −0.9 | −4.4 | 3.5 |
| Example 6 | 2360 | 189 | 0.52 | 0.49 | 158 | 0.5 | −2.8 | 3.3 |
| Comparative Example 8 | 2880 | 230 | 0.55 | 0.52 | 165 | 0.0 | −1.6 | 1.6 |
| Comparative Example 9 | 1920 | 154 | 0.49 | 0.76 | 141 | −2.9 | −3.7 | 0.8 |

TABLE 3-continued

| Example | Hc | | | | Bm | Output | Noise | S/N |
|---|---|---|---|---|---|---|---|---|
| | Oe | kA/m | SQ | SFD | mT | dB | dB | dB |
| Example 7 | 3200 | 256 | 0.56 | 0.47 | 142 | 1.2 | −3.1 | 4.3 |
| Example 8 | 3600 | 288 | 0.57 | 0.45 | 142 | 1.0 | −3.1 | 4.1 |

Results of Evaluating the Magnetic Disc Media

It is seen from the results shown in Table 3 that, in comparison with Comparative Examples, the magnetic powders in accordance with the invention showed a depressed increase in SFD even when the tabular diameter was small. It is also seen that they showed good output characteristics and low noise characteristic.

According to the invention, an increase in SFD is depressed and good output characteristics and a reduced noise can be obtained by reducing the particle size of the magnetic powder particles and adjusting D70/D50 in a specific range. Accordingly, there are provided a hexagonal ferrite magnetic powder adapted for a high-density recording reproducible by a highly sensitive head such as an MR head or a GMR head, a method for producing the hexagonal ferrite magnetic powder and a magnetic recording medium.

The entire disclosure of each and every foreign patent application from which the benefit of foreign priority has been claimed in the present application is incorporated herein by reference, as if fully set forth.

What is claimed is:

1. A hexagonal ferrite magnetic powder having an average tabular diameter of from 15 to 28 nm, a coercive force (Hc) of from 2,000 to 5,000 Oe, a switching field distribution (SFD) of from 0.3 to 0.7 and a D70/D50 of from 1.05 to 1.25.

2. A magnetic recording medium comprising:

a non-magnetic support; and a magnetic layer containing a hexagonal ferrite magnetic powder dispersed in a binder, wherein the hexagonal ferrite magnetic powder is a hexagonal ferrite magnetic powder according to claim 1.

3. The magnetic recording medium according to claim 2, which further comprises a non-magnetic layer containing a non-magnetic powder dispersed in a binder between the non-magnetic support and the magnetic layer.

\* \* \* \* \*